No. 749,391. PATENTED JAN. 12, 1904.
G. A. LUTZ.
BOND FOR CONDUITS FOR ELECTRIC WIRES.
APPLICATION FILED MAY 7, 1901. RENEWED JUNE 5, 1903.
NO MODEL. 2 SHEETS—SHEET 1.
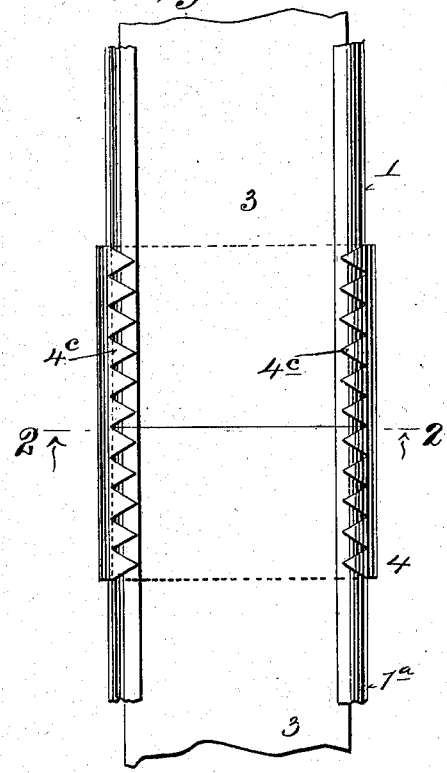
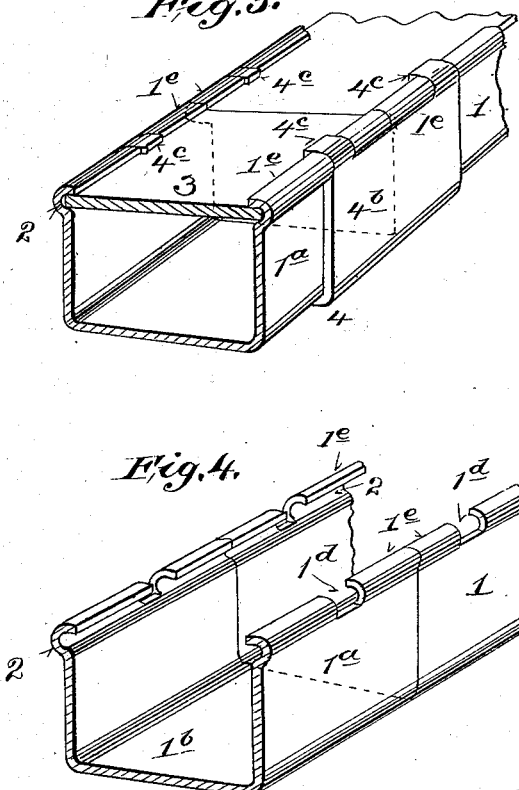
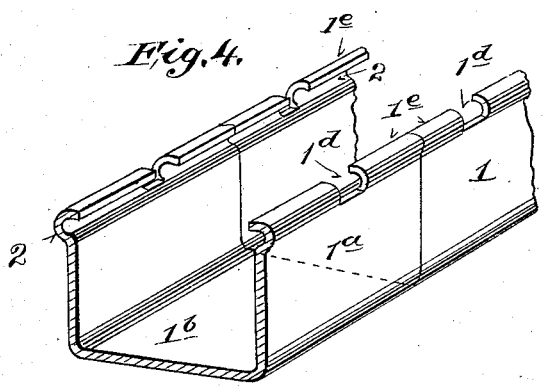
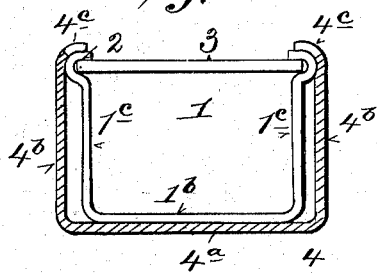
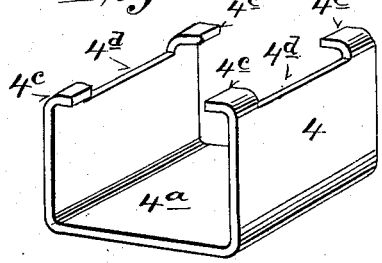
Witnesses;
C. W. Benjamin
M. Manning
Inventor;
Geo. A. Lutz,
by F. F. Bourne
his Atty No. 749,391. PATENTED JAN. 12, 1904.
G. A. LUTZ.
BOND FOR CONDUITS FOR ELECTRIC WIRES.
APPLICATION FILED MAY 7, 1901. RENEWED JUNE 5, 1903.
NO MODEL. 2 SHEETS—SHEET 2.

Witnesses,
C. W. Benjamin
M. Manning

Inventor,
Geo. A. Lutz,
by T. F. Bourne
his atty

No. 749,391. Patented January 12, 1904.

UNITED STATES PATENT OFFICE.

GEORGE A. LUTZ, OF NEW YORK, N. Y., ASSIGNOR, BY MESNE ASSIGN-MENTS, OF ONE-HALF TO FRANK K. BOLAND, OF NEW YORK, N. Y.

BOND FOR CONDUITS FOR ELECTRIC WIRES.

SPECIFICATION forming part of Letters Patent No. 749,391, dated January 12, 1904.

Application filed May 7, 1901. Renewed June 5, 1903. Serial No. 160,260. (No model.)

*To all whom it may concern:*

Be it known that I, GEORGE A. LUTZ, a citizen of the United States, residing in New York city, borough of Brooklyn, State of New York, have invented certain new and useful Improvements in Bonds for Conduits for Electric Wires, of which the following is a specification.

My invention has for its object to provide a bond for joining abutting ends of metallic conduits adapted to contain electric wires, and the type of conduit to which my invention has particular reference is shown in United States Letters Patent No. 667,567, issued to Emmett D. Page on February 5, 1901, in which a metallic conduit in the form of a channel is provided with a cover.

My invention consists in a bond comprising a member provided with a bottom and two sides forming a channel adapted to receive the abutting ends of substantially correspondingly-shaped conduits, the bond being provided with inwardly-projecting flanges or fingers adapted to grip the edges of the conduits to firmly clasp the latter against the metal of the bond, whereby the ends of the two conduits are firmly united and proper electrical contact is made to cause the parts to serve as a conductor for electricity.

The invention further consists in the novel details of improvement that will be more fully hereinafter set forth and then pointed out in the claims.

Reference is to be had to the accompanying drawings, forming part hereof, wherein—

Figure 6:
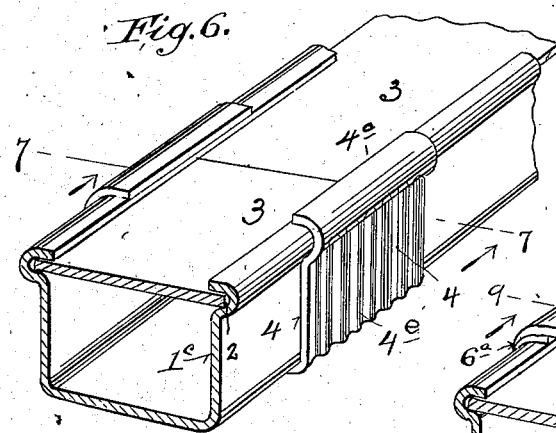
Figure 8:
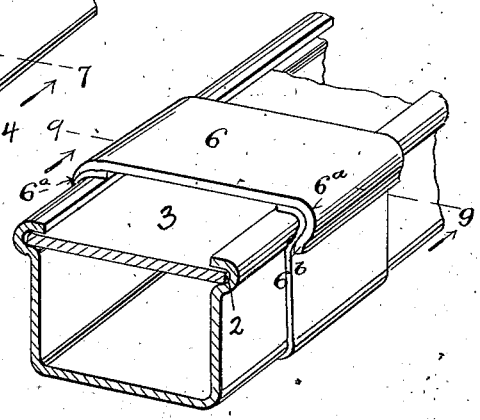
Figure 7:
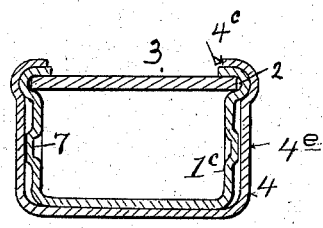
Figure 9:
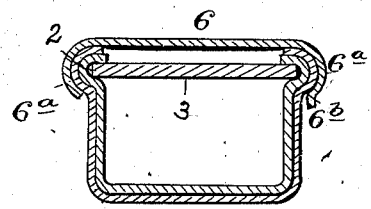

Figure 1 is a plan view illustrating my bond as applied over the abutting ends of two conduits. Fig. 2 is a cross-section on the line 2 2 in Fig. 1. Fig. 3 is a perspective view of a modified form of the bond and the ends of the conduits. Fig. 4 is a similar view of the ends of the conduits, the bond being removed. Fig. 5 is a perspective view of the bond. Fig. 6 is a perspective view illustrating further means for firmly holding the bond upon the conduits. Fig. 7 is a cross-section thereof on the line 7 7 in Fig. 6. Fig. 8 is a perspective view illustrating means for binding the band and the conduits together, and Fig. 9 is a cross-section on the line 9 9 in Fig. 8.

In the accompanying drawings, in which similar numerals of reference indicate corresponding parts in the several views, the numerals 1 1$^a$ indicate conduits, which are shown in the form of channels having a bottom 1$^b$ and two sides 1$^c$, which are provided at their upper ends with longitudinally-extending grooves 2, adapted to receive the edges of a cover 3, all substantially as shown in the patent above mentioned. These conduits may be formed of sheet metal bent or rolled to the desired shape.

4 is a bond which is shown in the form of a channel-piece having a bottom 4$^a$ and sides 4$^b$, adapted to receive the adjacent abutting ends of two conduits 1 1$^a$, so that the conduits will rest upon the bottom 4$^a$. The sides 4$^b$ at their upper edges have inwardly-turned projecting portions 4$^c$, adapted to overlie the outer portions of the sides of the conduits, as by extending over the outer webs of the grooves 2. The proportions of the parts should be such that the projections 4$^c$ will have to be forced or sprung over the upper edges or webs of the conduits to firmly clamp the bottoms of the conduits upon the bottom of the bond, thereby mechanically binding the parts together and at the same time affording good electrical contact, thus providing a conductor between adjacent ends of the conduits.

In Figs. 1 and 2 the projections 4$^c$ are shown in the form of teeth which can be readily sprung over the upper edges of the sides of the conduits, and the walls 4$^b$ of the bond preferably have an inward lateral spring tendency permitting them to spread apart when the bond is clamped upon the conduits and to cause the projections to press inwardly and downwardly upon the conduits. The curved or inclined coacting surfaces of the upper edges or webs of the conduits and of the projections 4$^c$ of the bond further serve in maintaining pressure between the parts.

Provision may be made to prevent the bond 4 from spontaneously slipping along the conduits past the meeting ends and to keep the two conduits locked together and prevent them from being drawn apart.

In Figs. 3, 4, and 5 I have shown an arrangement for this purpose in which the upper grooved edges of the sides of the conduits are provided with notches or recesses $1^d$, and the projections or fingers $4^c$ of the bond 4 are adapted to enter said recesses, the material or webs $1^e$ of the conduits at the sides of the projections $4^c$ serving to prevent movement of the bond and the conduits in a longitudinal direction.

As shown, the portions of the bond intermediate the projections $4^c$ are cut away, forming spaces at $4^d$, whereby the curved upper edges or webs $1^e$ of the sides of the conduits can enter said spaces, the corresponding edges of the bond lying under the portions $1^e$ of the conduits. In this instance, also, the proportions of the parts are such as to cause the bond to firmly grip the ends of the adjacent conduits to make electrical connection therewith, as before explained.

As a modified means of preventing longitudinal movement of the conduits relatively to the bond I have shown in Fig. 6 interlocking projections on the sides of the conduits and the bond, and for this purpose the sides of the bond are shown as corrugated or grooved transversely of the length of the conduits, as at $4^e$, the corresponding sides of the conduits having projections 5 to enter the grooves so formed. The projections 5 may be made in any suitable manner—as, for instance, by punching the metal of the sides of the conduits outwardly or by fastening the projections thereto. These interlocking projections prevent longitudinal movement of the parts 4 and 1, as before described. I have also shown means for maintaining the grip of the bond upon the conduits, and to this end I provide a cross-piece 6, provided with inwardly-turned edges $6^a$, adapted to engage the bent upper edges of the conduits or the corresponding portions of the upper edges of the sides of the bond. The transverse dimensions of this locking-piece 6 should be such as to require it to be sprung or forced over the bond and conduit in the position shown in Fig. 8, and to enable the ready removal of the locking-piece I have shown its lower edge at $6^b$ as bent outwardly free from the sides of the bond to enable a tool to be inserted in the space thus formed to pry off the locking-piece. This locking-piece serves to draw the bond firmly against the upper edges of the conduit, causing the bond to firmly grip the conduit.

The conduits above described may be placed within or upon a wall, ceiling, or the like, and may be made of suitable length, and where the abutting ends of two conduits meet the bond will be applied, as stated. The bond serves to maintain the conduits in alinement, connects them rigidly together, prevents them from becoming displaced, and thereby provides continuous channels in which electric wires can be placed.

At any time it is desired to remove the conduit the bond can be readily detached from the same.

The details of construction shown and described may be varied without departing from the spirit of my invention.

Having now described my invention, what I claim is—

1. A bond of the character described, having a bottom and side portions forming a channel or space to receive conduits and having inwardly-extending projections having an inward spring tendency, said projections being located at the outer ends of the side portions adapted to clamp conduits within the bond, substantially as described.

2. A bond comprising a metallic member having a bottom and sides provided with inwardly-extending projections having an inward spring tendency forming a channel or space to receive conduits, said projections being adapted to overlie and bear upon conduits to clamp the same upon the bottom of the bond, substantially as described.

3. The combination of conduits provided with sides having longitudinally-extending grooves, with a bond having a channel to receive the ends of the conduits and having inwardly-extending projections having an inward spring tendency adapted to bear upon the upper edges of the conduits to firmly clamp the conduits between the bottom of the bond and its projections, substantially as described.

4. The combination of conduits provided with channels, a bond having inwardly-extending projections to bear upon the conduits, and means for preventing longitudinal movement of the conduits and bond relatively to each other, substantially as described.

5. The combination of conduits having channels, with a bond having a channel to receive said conduits and provided with inwardly-extending projections to grip the conduits, the conduits and bond having interlocking members adapted to prevent longitudinal movement of the parts relatively to each other, substantially as described.

6. The combination of conduits having channels, the upper edges of the conduits being provided with recesses, with a bond having inwardly-extending projections adapted to enter said recesses, the metal of the conduits at the sides of said recesses and said projections serving to prevent longitudinal movement of the conduits and bond relatively to each other, substantially as described.

7. The combination of conduits having channels, a bond inclosing the abutting ends of the conduits, means for clamping the bond upon the conduits, and a locking-piece overlying the conduits having means for holding the bond and conduits pressed together, substantially as described.

8. The combination of conduits having channels, a bond inclosing the ends of the conduits, means for clamping the bond upon the conduits, and a strip or plate overlying the same and provided with inwardly-turned edges adapted to overlie and grip the upper edges of the bond and the conduit to clamp them firmly together, substantially as described.

GEO. A. LUTZ.

Witnesses:
M. MANNING,
T. F. BOURNE.